US009064110B2

(12) United States Patent
Akiyama et al.

(10) Patent No.: US 9,064,110 B2
(45) Date of Patent: *Jun. 23, 2015

(54) ANOMALY DETECTION TO IMPLEMENT SECURITY PROTECTION OF A CONTROL SYSTEM

(71) Applicant: International Business Machines Corporation, Armonk, NY (US)

(72) Inventors: Kazuhito Akiyama, Yamato (JP); Akira Ohkado, Yamato (JP); Yukihiko Sohda, Yamato (JP); Masami Tada, Yamato (JP); Tadashi Tsumura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 200 days.

This patent is subject to a terminal disclaimer.

(21) Appl. No.: 13/765,142

(22) Filed: Feb. 12, 2013

(65) Prior Publication Data

US 2013/0152198 A1 Jun. 13, 2013

Related U.S. Application Data

(63) Continuation of application No. 13/365,594, filed on Feb. 3, 2012, now Pat. No. 8,726,085.

(30) Foreign Application Priority Data

Feb. 14, 2011 (JP) .................................. 2011-028341

(51) Int. Cl.
*G06F 11/00* (2006.01)
*G06F 21/50* (2013.01)
(Continued)

(52) U.S. Cl.
CPC ................ *G06F 21/50* (2013.01); *G06F 11/07* (2013.01); *G06F 21/554* (2013.01); *H04L 63/1425* (2013.01)

(58) Field of Classification Search
CPC .................................................... G06F 11/007
USPC .......................................... 714/26, 2, 4.1, 48
See application file for complete search history.

(56) References Cited

U.S. PATENT DOCUMENTS 4,325,251 A 4/1982 Kanegae
7,539,845 B1 5/2009 Wentzlaff et al.
(Continued)

FOREIGN PATENT DOCUMENTS

EP 14203117 A2 5/2004
JP 06348239 A 12/1994
(Continued)

OTHER PUBLICATIONS

U.S. Appl. No. 13/365,533.
(Continued)

*Primary Examiner* — Dieu-Minh Le
(74) *Attorney, Agent, or Firm* — Francis Lammes; Stephen J. Walder, Jr.; Jeffrey S. LaBaw

(57) ABSTRACT

An anomaly detection mechanism is provided that detects an anomaly in a control network, and includes an identifying unit to receive event information on an event that occurs, and to identify a group including a resource related to the event information by referring to a configuration management database for retaining dependence relationships between processes and resources including a control system; a policy storing unit to store one or more policies each of which associates one or more actions with a condition defining a situation suspected to have an anomaly; an adding unit to acquire group-related information needed for application to the one or more policies, and to add the acquired information to the event information; and a determining unit to apply the event information to the one or more policies and to determine the one or more actions associated with the matched condition as one or more actions to be taken.

7 Claims, 12 Drawing Sheets

(51) Int. Cl.
  *G06F 11/07* (2006.01)
  *G06F 21/55* (2013.01)
  *H04L 29/06* (2006.01)

(56) References Cited

U.S. PATENT DOCUMENTS

| | | | |
|---|---|---|---|
| 7,636,915 | B1 | 12/2009 | DiVittorio |
| 2003/0191966 | A1 | 10/2003 | Gleichauf |
| 2006/0021029 | A1 | 1/2006 | Brickell et al. |
| 2006/0114832 | A1* | 6/2006 | Hamilton et al. ............ 370/244 |
| 2006/0236374 | A1 | 10/2006 | Hartman |
| 2008/0082284 | A1 | 4/2008 | Carroll et al. |
| 2008/0134178 | A1* | 6/2008 | Fitzgerald et al. ................. 718/1 |
| 2009/0002150 | A1 | 1/2009 | Zilberstein et al. |
| 2009/0083843 | A1 | 3/2009 | Wilkinson, Jr. et al. |
| 2010/0076575 | A1 | 3/2010 | Vasko et al. |
| 2011/0145926 | A1 | 6/2011 | Dalcher et al. |
| 2011/0184575 | A1 | 7/2011 | Kawamoto et al. |
| 2011/0290893 | A1 | 12/2011 | Steinberg |
| 2012/0203508 | A1 | 8/2012 | Hamzaoui et al. |
| 2012/0209411 | A1 | 8/2012 | Ohkado et al. |
| 2012/0210158 | A1 | 8/2012 | Akiyama et al. |

FOREIGN PATENT DOCUMENTS

| | | | |
|---|---|---|---|
| JP | 08077119 | A | 3/1996 |
| JP | 9069083 | A | 3/1997 |
| JP | 09-237240 | | 9/1997 |
| JP | 10501354 | A | 2/1998 |
| JP | 2000047987 | A | 2/2000 |
| JP | 2000508104 | A | 6/2000 |
| JP | 2001-243587 | A | 9/2001 |
| JP | 2002007234 | A | 1/2002 |
| JP | 2002-509669 | | 3/2002 |
| JP | 2002-510415 | | 4/2002 |
| JP | 2002111727 | A | 4/2002 |
| JP | 2002-149614 | A | 5/2002 |
| JP | 2003036243 | A | 2/2003 |
| JP | 2003114294 | A | 4/2003 |
| JP | 2004-118866 | A | 4/2004 |
| JP | 2004518193 | A | 6/2004 |
| JP | 2004234401 | A | 8/2004 |
| JP | 2004-302538 | A | 10/2004 |
| JP | 2005063054 | A | 3/2005 |
| JP | 3701688 | B2 | 5/2005 |
| JP | 2005-250802 | A | 9/2005 |
| JP | 2005-277655 | A | 10/2005 |
| JP | 2006-033140 | A | 2/2006 |
| JP | 2006-049909 | A | 2/2006 |
| JP | 2006178936 | A | 7/2006 |
| JP | 2006252256 | A | 9/2006 |
| JP | 2007-096735 | A | 4/2007 |
| JP | 2007-526452 | A | 9/2007 |
| JP | 2007-274027 | A | 10/2007 |
| JP | 2008-015722 | A | 1/2008 |
| JP | 2008500653 | A | 1/2008 |
| JP | 2008097164 | A | 4/2008 |
| JP | 2008527471 | A | 7/2008 |
| JP | 2008537267 | A | 9/2008 |
| JP | 2008-243195 | A | 10/2008 |
| JP | 2009-015861 | | 1/2009 |
| JP | 2009009557 | A | 1/2009 |
| JP | 2009-037545 | A | 2/2009 |
| JP | 2009-529187 | A | 8/2009 |
| JP | 2009-245029 | A | 10/2009 |
| JP | 4521456 | B2 | 8/2010 |
| JP | 4567106 | B2 | 10/2010 |
| JP | 2010267119 | A | 11/2010 |

OTHER PUBLICATIONS

U.S. Appl. No. 13/365,594.
U.S. Appl. No. 13/365,626.
U.S. Appl. No. 13/766,338.
U.S. Appl. No. 13/803,388.
Dzung, Dacfey et al., "Security for Industrial Communication Systems", Proceedings of the IEEE, vol. 93, No. 6, Jun. 2005, pp. 1152-1177.
Falco, Joe et al., "IT Security for Industrial Control Systems", http://citeseerx.ist.psu.edu/viewdoc/download?doi=10.1.1.13.9422&rep=rep1&type=pdf, date unknown, 16 pages.
Stouffer, Keith et al., "Guide to Industrial Control Systems (ICS) Security", National Institute of Standards and Technology Special Publication 800-82 (Final Public Draft) Natl. Inst. Stand. Technol. Spec. Publ. 800-82, (Sep. 2008), 156 pages.

* cited by examiner

FIG. 4

| CONFIGURATION ITEM | CATEGORY | MODEL | ATTRIBUTE | | DEFINED RELATIONSHIP | |
|---|---|---|---|---|---|---|
| PROCESS A | PROCESS | REGULAR INSPECTION | IDENTIFICATION VALUE | | uses | CONTROL SYSTEM A |
| | | | PURPOSE | | uses | CONTROL SYSTEM B |
| | | | ISSUER | | usedBy | PROCESS A |
| | | | OWNER | | manages | DEVICE A |
| | | | SCHEDULE | | managedBy | CONTROL SYSTEM A |
| | | | IMPORTANCE | | poweredBy | INSTRUMENT A |
| | | | ⋮ | | contains | SENSOR A |
| | | | | | contains | SENSOR B |
| | | | | | contains | ACTUATOR A |
| CONTROL SYSTEM A | RESOURCE | CONTROL SYSTEM | IDENTIFICATION VALUE | | | |
| | | | LOCATION | | | |
| | | | ALLOWABLE CONDITION | | | |
| | | | ALLOWABLE ACTION | | | |
| | | | ⋮ | | | |
| DEVICE A | RESOURCE | DEVICE | IDENTIFICATION VALUE | | | |
| | | | LOCATION | | | |
| | | | ALLOWABLE CONDITION | | | |
| | | | ALLOWABLE ACTION | | | |
| | | | ⋮ | | | |
| ⋯ | ⋯ | ⋯ | ⋯ | | ⋯ | |

| PROCESS ID | PROCESS NAME | CATEGORY | STATUS | DEADLINE | START DATE/TIME | SCHEDULED COMPLETION DATE/TIME | ISSUER | OWNER | IMPORTANCE |
|---|---|---|---|---|---|---|---|---|---|
| PROCESS A | PROCESS A | REGULAR INSPECTION | STANDBY | 20xx/xx/xx | 20xx/xx/xx 23:00 | 20xx/xx/xx 23:30 | userA | userA | NORMAL |
| PROCESS B | PROCESS B | INCIDENT | STANDBY | 20xx/xx/xx | - | - | userB | userC | HIGH |
| ... | ... | ... | ... | ... | ... | ... | ... | ... | ... |
| 242 | 244 | 246 | 248 | 250 | 252 | 254 | 256 | 258 | 260 |

```
<security policy ID = "1">
    <matching description section>
        (status of process using sender resource = "running") AND
        (event data is out of allowable range of sender resource)
    </matching description section>
    <action description section>
        <action>
            <action target>resources in sender resource group</action target>
            <action instruction>block all events of event type = operation</action instruction>
        </action>
    </action description section>
</security policy>
```

FIG. 7B

```
<security policy ID = "2">
    <matching description section>
        (there is no process using sender resource: null) AND
        (event type = "sensor data")
    </matching description section>
    <action description section>
        <action>
            <action target>external mail system</action target>
            <action instruction>issue alert</action instruction>
        </action>
    </action description section>
</security policy>
```

FIG. 7C

```
<security policy ID = "3">
    <matching description section>
        (status of process using destination resource = "running") AND
        (event type = "operation") AND
        (event data > maximum allowable value of destination resource)
    </matching description section>
    <action description section>
        <action>
            <action target>destination resource</action target>
            <action instruction>correct event data (using maximum allowable value of
            destination resource)</action instruction>
        </action>
    </action description section>
</security policy>
```

FIG. 8A

```
<security policy ID = "4">
    <matching description section>
        (status of process using sender resource = "running") AND
        (event data is out of allowable range of sender recourse) AND
        (event type = "operation")
    </matching description section>
    <action description section>
        <action>
            <action target>resources in destination resource group</action target>
            <action instruction>block event</action instruction>
        </action>
    </action description section>
</security policy>
```

FIG. 8B

```
<security policy ID = "5">
        <matching description section>
                (status of process using sender resource = "running") AND
                (event data is out of allowable range of sender recourse)
        </matching description section>
        <action description section>
                <action>
                        <action target>resources in sender resource group</action target>
                        <action instruction>issue event (shutdown resources)</action instruction>
                </action>
        </action description section>
</security policy>
```

FIG. 9A

```
<security policy ID = "6">
        <matching description section>
                (process using sender resource != process using destination resource)
        </matching description section>
        <action description section>
                <action>
                        <action target>resources in destination resource group</action target>
                        <action instruction>block event (shutdown resources)</action instruction>
                </action>
        </action description section>
</security policy>
```

FIG. 9B

```
<security policy ID = "7">
    <matching description section>
        (importance of process using sender resource = "HIGH") AND
        (event type = "operation")
    </matching description section>
    <action description section>
        <action>
            <action target>destination resource </action target>
            <action instruction>block event (shutdown resource)</action instruction>
        </action>
    </action description section>
</security policy>
```

FIG. 10A

```
<security policy ID = "8">
    <matching description section>
        (importance of process using sender resource < importance of process using
        destination resource)
    </matching description section>
    <action description section>
        <action>
            <action target>resources in destination resource group</action target>
            <action instruction>block event</action instruction>
        </action>
    </action description section>
</security policy>
```

FIG. 10B

```
<security policy ID = "9">
        <matching description section>
                (importance of process using sender resource = "LOW")
                (event data is within allowable range of sender resource)
        </matching description section>
        <action description section>
                <action>
                        <action target>sender resource</action target>
                        <action instruction>block event</action instruction>
                </action>
        </action description section>
</security policy>
```

FIG. 11A

```
<security policy ID = "10">
        <matching description section>
                (status of process using destination resource = "running") AND
                (event type = "operation") AND
                (event data > maximum allowable value of destination resource) AND
                (anomaly (out of allowable range) occurs less than five times per hour in whole
                destination resource group)
        </matching description section>
        <action description section>
                <action>
                        <action target>destination resource </action target>
                        <action instruction>correct event data (using maximum allowable value of
                        destination resource)</action instruction>
                </action>
                <action>
                        <action target>inside</action target>
                        <action instruction>record anomaly (out of allowable range) for destination
                        resource group</action instruction>
                </action>a
        </action description section>
</security policy>
```

FIG. 11B

```
<security policy ID = "11">
        <matching description section>
                (status of process using destination resource = "running") AND
                (event type = "operation") AND
                (event data > maximum allowable value of destination resource) AND
                (anomaly (out of allowable range) occurs five times or more per hour in whole
                destination resource group)
        </matching description section>
        <action description section>
        <action description section>
                <action>
                        <action target>resources in destination resource group</action target>
                        <action instruction>issue event (shutdown resources)</action instruction>
                </action>
                <action>
                        <action target>inside</action target>
                        <action instruction>reset record of anomaly (out of allowable range) for
                        destination resource group</action instruction>
        </action description section>
</security policy>
```

ANOMALY DETECTION TO IMPLEMENT SECURITY PROTECTION OF A CONTROL SYSTEM

BACKGROUND

The present invention relates to an information security technique and more specifically relates to an anomaly detection to implement security protection of a control system.

Modern societies are established on the basis of various types of infrastructures such as power supply, gas supply, water supply, railways, finance, plants and pipelines. The control systems for the foregoing socially-important infrastructures may influence largely a social economy if the control systems functions are paralyzed, and therefore have heretofore been designed and operated on the assumption that the control systems should be operated in closed systems isolated from the outside and designed under the specifications not open to the public. With recent requirements in management aspect, such as connectivity productivity improvement, and enhancement in business judgment efficiency, however, the control systems are now in the transition from the foregoing conventional systems to open systems. Products dedicated and configurations unique to the control systems have already begun to be replaced with generally-available products and standard protocols such as TCP/IP. In addition, the advancement of collaboration between control systems and collaboration between a control system and an information processing system via networks is now in progress.

With the transition to open control systems, however, the control systems are exposed to various threats that information processing systems face, such for example as vulnerability, unauthorized accesses, information leakage, viruses and worms, all of which are prevalent in generally-available products. If by any chance any of the aforementioned important infrastructures is attacked, the influence of the attack is large in scale and is wide in range. Moreover, since an industrial control system controls actuators such as pumps and valves in a plant or pipeline, a malfunction of the industrial control system may cause human damages or environmental destruction in some cases. For this reason, along with the transition into the open control system, the establishment of high-level security is demanded for protecting the control system from these threats. Moreover, if by any chance there occurs a situation suspected to be due to any of the foregoing threats, a prompt detection of an anomaly due to the threat is desired, and the performance of appropriate countermeasures against the anomaly are preferred.

Since the foregoing problems such as vulnerability and unauthorized access have been occurring in information processing systems, security techniques applied to the information processing systems are considered to be effective also on the control systems to some extent. As one of the security techniques for information processing systems, Japanese Patent No. 4521456 (Patent Literature 1) discloses an information processing apparatus configured to distribute security policies to management target information processing apparatuses. The security policies herein are used to control the operations of the management target information processing apparatuses. In addition, Japanese Patent Application Publication No. 2007-274027 (Patent Literature 2) discloses a remote operation system with which a recovery service through remote control can be easily introduced. However, since the industrial control systems have features different from those of the information processing systems, simple application of the security techniques used in the information processing systems is not sufficient in some cases. In such cases, it is not possible to promptly detect an anomaly suspected to be due to any of the foregoing threats and to take countermeasures against the anomaly.

Meanwhile, recent information technology (IT) services have paid attention to a configuration management database (CMDB) in order to centralize management of information on management target components and to provide necessary information when necessary. The CMDB is a database for retaining and managing, as configuration items (CI), components including resources such as hardware and software, documents, incident history information and human resources, all of which are targets managed by service management, thereby allowing one to know about these components (Patent Literatures 3 and 4).

PATENT LITERATURES

Japanese Patent No. 4521456
Japanese Patent Application Publication No. 2007-274027
Japanese Patent Application Publication No. 2009-245029
Japanese Patent Application Publication No. Hei 9-69083

SUMMARY

The present invention has been made in view of the foregoing conventional problems in control systems, and aims to provide an anomaly detection apparatus, an anomaly detection method, and a recording medium, each of which is capable of detecting a behavior suspected to have an anomaly from data traffic flowing in a network among components such as a device, an instrument, a sensor, and an actuator in a control system, while taking dependence relationships between the components into consideration by using the foregoing configuration management database, and thereby taking a protective action promptly.

To solve the foregoing problems of the related art, the present invention aims to provide an anomaly detection apparatus. The anomaly detection apparatus of the present invention receives event information on an event that occurs in a control network, and identifies a group including a resource related to the event information by referring to a configuration management database for retaining dependence relationships between processes and resources including the control system. The anomaly detection apparatus applies the event information to the one or more policies and determines the one or more actions associated with the matched condition as one or more actions to be taken. The anomaly detection apparatus then implements the one or more actions to be taken.

In another illustrative embodiment, an anomaly detection method is provided. The anomaly detection method executed by a processor, cause the processor to perform various ones of, and combinations of, the operations outlined above with regard to the anomaly detection apparatus.

In other illustrative embodiments, a recording medium having a computer-executable program is provided. The computer-executable program, when executed on a computing device, causes the computing device to perform various ones of, and combinations of, the operations outlined above with regard to the anomaly detection apparatus.

These and other features and advantages of the present invention will be described in or will become apparent to those of ordinary skill in the art, in view of the following detailed description of the example embodiments of the present invention.

BRIEF DESCRIPTION OF THE SEVERAL VIEWS OF THE DRAWINGS

Embodiments of the present invention will now be described by way of example with reference to the accompanying drawings in which like references denote similar elements, and in which:

FIG. 4 is a diagram illustrating a data structure of the configuration management database;

FIG. 5 is a diagram illustrating a data structure for processes managed by a process management system;

FIGS. 7A to 7C are diagrams illustrating data structures of security policies;

FIGS. 8A and 8B are diagrams illustrating data structures of other security policies;

FIGS. 9A and 9B are diagrams illustrating data structures of other security policies;

FIGS. 10A and 10B are diagrams illustrating data structures of other security policies; and FIGS. 11A and 11B are diagrams further illustrating data structures of still other security policies.

DETAILED DESCRIPTION

The present invention will be hereinafter described based on embodiments, but the present invention is not limited to the following embodiments. In the following embodiments, an anomaly detection apparatus and a supervisory control system to detect an anomaly in a control network including one or more control systems are described by taking, as examples, an analysis engine to detect an anomaly in the control network, and an industrial system including the analysis engine and a security gateway.

Figure 1:
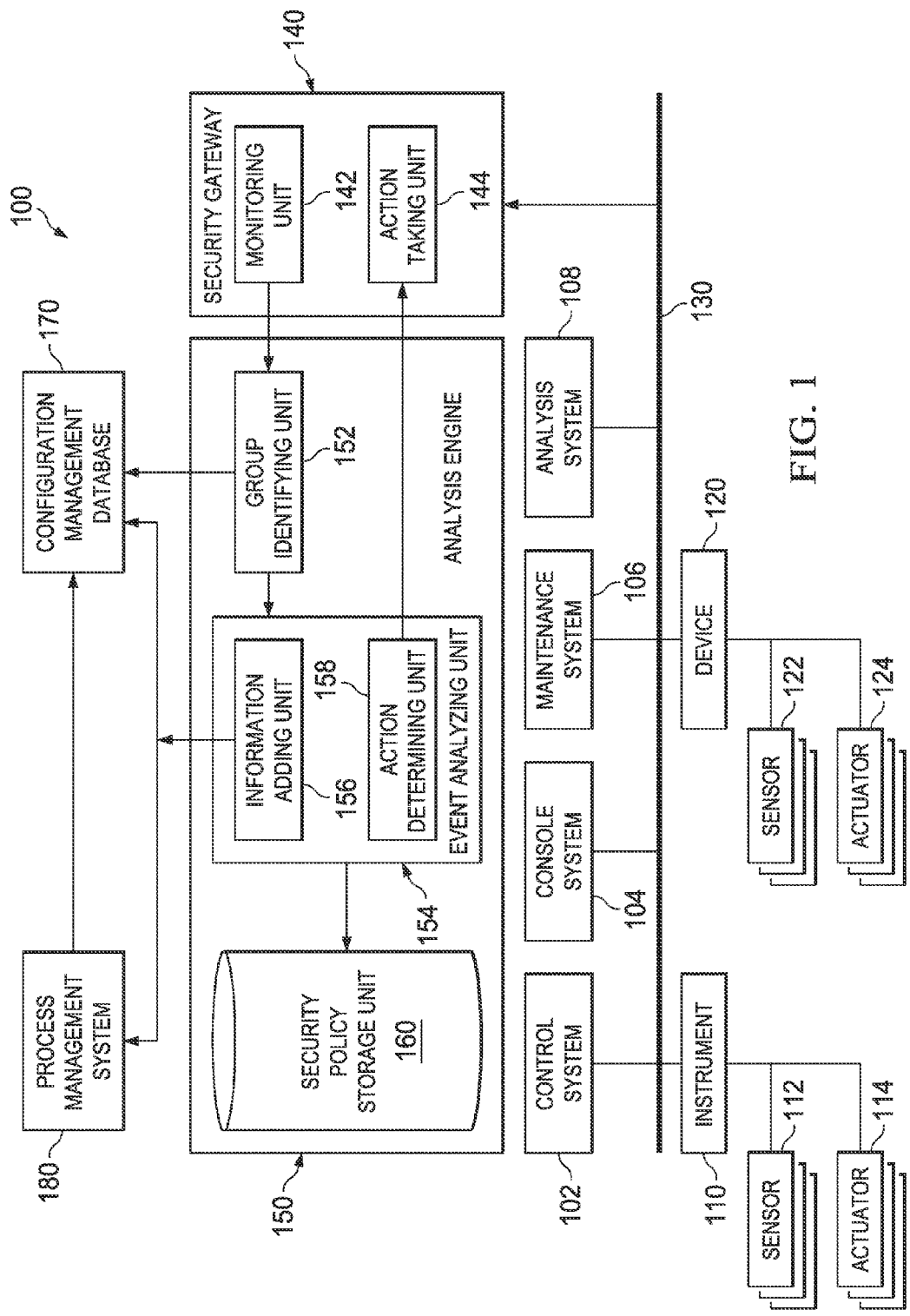
FIG. 1 is a diagram showing a schematic configuration of an industrial system according to an embodiment of the present invention.

Herein below, an overall configuration of an industrial system according to an embodiment of the present invention will be described with reference to FIG. 1. FIG. 1 is a diagram showing a schematic configuration of an industrial system according to the embodiment of the present invention. An industrial system 100 shown in FIG. 1 includes a control system 102, a console system 104, a maintenance system 106, an analysis system 108, an instrument 110 and a device 120, all of which are connected to a control network 130. The industrial system 100 is a system used in the field of, for example, agriculture, finance, chemistry, commercial facility, dam, defense industry infrastructure, emergency service, energy, governmental facilities, information technology, nuclear reactor, distribution of goods, public health, communications, transportation, water supply, important manufacturing industry, or the like.

The control system 102 is a system to perform system monitor and process control of the instrument 110 and the device 120, and is a host computer in a system such as a distributed control system (DCS), or a supervisory control and data acquisition (SCADA) system which collects control data of geographically-distributed control targets from a remote site by monitoring the control targets in a centralized manner, for example. The control system 102 may additionally include a programmable logic controller (PLC) and a remote terminal unit (RTU). The console system 104 is a human-machine interface (HMI) to present data of the target systems to an operator, and allow the operator to monitor and control the systems. The maintenance system 106 is a system to perform remote inspection and maintenance of the instrument 110, the device 120 and the like. The analysis system 108 is an analysis system to apply a correlation model or the like to data collected through the gateway from sensor terminals, and thereby to detect an anomaly from the data on the basis of the statistical analysis.

Both of the instrument 110 and the device 120 are sensor terminals connected to field instruments such as sensors 112 and 122 and actuators 114 and 124 through sensor buses, respectively. The classifications of the instrument 110 and the device 120 can be determined as needed by an administrator of the industrial system 100. In the embodiment described herein, the instrument 110 is mainly an apparatus to function alone, and the device 120 is mainly an apparatus which can be equipped with another instrument 110. The above sensors 112 and 122 are not particularly limited to but may include various measuring instruments such as a thermometer, a hygrometer, a flow meter, a water level indicator, an illuminometer, a power meter and a motion sensor. The above actuators 114 and 124 are not particularly limited to but may include a motor and any instrument that functions actively, in addition to a valve and a compressor.

The control network 130 is not particularly limited to but may include a field network, a control network, and a control information network. Various types of signals and data are transmitted on the control network 130. In the industrial system 100 according to the embodiment of the present invention, one or more security gateways 140 are further connected to the control network 130. The security gateway 140 monitors traffic on the control network 130 and picks up an event occurring in the control network 130 to detect an anomaly. The security gateway 140 is connected to the analysis engine 150, performs conversion of the signal and data related to the picked-up event into an appropriate format, and then passes the resultant signal and data to the analysis engine 150 for detailed analysis.

The analysis engine 150 tries to detect an anomaly occurring in the control network 130 by analyzing the received event information. In the case of the control network 130, monitoring of a behavior of each of the components such as the instrument, the device, the sensors, the actuators and the like in the control network 130, alone, may result in a failure in detecting an anomaly occurring in the control network 130. For example, if an actuator operates even though the actuator is out of use, or is not scheduled to be used in the plan, a certain anomaly such as a fraudulent access can be naturally suspected. However, it is difficult to detect a hidden threatening action as an anomaly from the behavior of the actuator as long as the actuator itself operates within a normal working range. In other words, in order to correctly detect an anomaly in the control system, it is necessary, unlike the general information processing systems, first to figure out dependency relationships between the foregoing resources such as the device, the instrument, the sensors, and the actuators, and then to pick up an event suspected to have an anomaly from data traffic flowing among the resources.

For this reason, in the industrial system 100 according to the embodiment of the present invention, the analysis engine 150 analyzes the event information while taking the dependence relationships between the instrument, device, sensors, actuators and the like into consideration in collaboration with a configuration management database (CMDB) 170. If an anomaly is suspected to occur as a result of the event analysis, the analysis engine 150 determines a recommended protective action, notifies the security gateway 140 of the recommended action, and thereby causes the security gateway 140 to take the protective action.

Hereinafter, a configuration for supervisory control based on the anomaly detection in collaboration with the CMDB 170 will be described in more detail. To be more specifically, the security gateway 140 includes a monitoring unit 142. The monitoring unit 142 monitors traffic transmitted in the control network 130, such as sensor data, sensor signals, and operation instructions and control signals to actuators, generates event information in a predetermined format, and passes the event information to the analysis engine 150. Since many and various formats of data and signals are supposed to be transmitted on the control network 130, the monitoring unit 142 preferably has a function as a format converter to convert data from various data formats into a unified data format.

In a preferable embodiment, the monitoring unit 142 is capable of generating event information in a predetermined format from data and signals expressed in many and various formats. The event information includes a sender ID for identifying a sender, destination ID for identifying a destination, an event type for identifying a type of event, and event data that is the aforementioned sensor data or operation instruction. The event type indicates a type of event, such as sensor data or an operation instruction. In general, the event data includes sensor data in the case of an output from each of the sensors 112 and 122, and includes a command and arguments thereof in the case of an operation instruction to each of the actuators 114 and 124.

The analysis engine 150 includes a group identifying unit 152 and an event analyzing unit 154 in more detail. The group identifying unit 152 receives the event information from the monitoring unit 142 of the security gateway 140 and queries the CMDB 170. The CMDB 170 retains configuration items (CI) and detailed information of important attributes thereof, and also manages relationships between the configuration items to implement integrated configuration management of the information on management targets. The configuration items (CI) are basic units for managing information in the CMDB 170, and are mainly classified into processes and resources in the embodiment of the present invention.

In the foregoing configuration items, "resource" (hereinafter, a configuration item of "resource" will be referred to as a resource CI) can include components such as the foregoing control system, instrument, device, sensors, actuators, network device, console system, maintenance system, and analysis system, and also include equipment and facilities such as other floors and buildings. In the foregoing configuration items, "process" (hereinafter, a configuration item of "process" will be referred to as a process CI) can include a process or task using or scheduled to use the resource (hereinafter "scheduled to use" will be also simply referred to as "using"). The granularity of processes is not particularly limited, but the processes may have a relationship in which a process includes other processes, like sub-projects constituting a project in a project management system, and steps constituting a work flow in a work flow management system. Citable exemplar processes are a regular inspection process, a normal manufacturing process, an incident response process, an emergency response process and the like.

The group identifying unit 152 queries the CMDB 170 by using the sender ID and the destination ID included in the event information, acquires a group ID for identifying a resource group including the resource of the sender or destination related to the event information, and adds the group ID to the event information. Here, the resource group is a set of resources grouped by tracing dependence relationships defined in the CMMB 170, i.e., by tracing a process using a resource of interest, other resources used by the process, and so on. Incidentally, in an embodiment in which no resource group is managed in the CMDB 170, an ID list of resources belonging to a group may be used instead of the group ID. In either case, information for identifying a group (hereinafter, the group ID and the ID list of resources are collectively referred to as group identification information) is added to the event information. The event information to which the group identification information is added (hereinafter referred to as group-identified event information) is passed from the group identifying unit 152 to the event analyzing unit 154.

The event analyzing unit 154 receives the group-identified event information from the group identifying unit 152, and executes matching processing and action determination processing according to a given security policy by using the information included in the received group-identified event information. The event analyzing unit 154 includes an information adding unit 156 and an action determining unit 158 in more detail. The security policy is user-defined data in which matching conditions specifying a situation that should be suspected to have an anomaly in the control network 130 is associated with one or more protective actions against the suspected anomaly. The security policy includes a matching description section in which the matching conditions are described, and an action description section in which one or more protective actions associated with the matching conditions is described. One or more security policies are managed in a security policy storage unit 160. The matching conditions may preferably include a condition related to a dependence relationship between sender and destination resources.

When the group-identified event information needs additional information in order to make evaluations on the matching description sections, the information adding unit 156 further enriches the group-identified event information by querying an external system. Here, the information added for enrichment may include various kinds of information related to a group (hereinafter, referred to as group-related information), for example, attribute information of each resource in the group, and attribute information and status information of each process in the group. In addition, when additional information is also needed to select an action target in the process of determining a protective action, the information adding unit 156 also queries an external system, adds information needed in the process of determining a protective action, and thereby enriches the group-identified event information.

As the aforementioned external systems, various systems may be employed, such as the CMDB 170 and a process management system 180 as well as other systems such as an asset management system, a historian, a project management system, and a scheduler. Here, FIG. 1 illustrates a process management system 180 as an example. The process management system 180 manages entities of process definitions in the industrial system 100, and manages the real-time statuses of the processes. The processes can be managed as the configuration items in the CMDB 170. To manage the dynamically-changing status values of the processes, however, use of the process management system 180 specialized for process management is more preferable than use of the CMDB 170. For this reason, in the embodiment described herein, the process management system 180 manages the entities of the process definitions and the process CIs are defined in the CMDB 170 according to the definitions of the entities.

The action determining unit 158 derives a recommended protective action by applying the group-identified event information to the security policies. The action determining unit 158 according to the embodiment of the present invention is preferably capable of deriving a protective action while taking the dependence relationships into consideration by using the information indicating the dependence relationships included in the enriched group-identified event information. More specifically; the action determining unit 158 makes an evaluation on the matching description section of each security policy in comparison with the group-identified event information. If the security policy having the matching conditions with which the event information matches is found, the action determining unit 158 reads the action description section associated with the matched conditions, and determines one or more protective actions.

The matching conditions are not particularly limited to but may include a conditional expression of a process related to a sender resource in the event information, a conditional expression of a process related to a destination resource in the event information, a conditional expression of both processes related to the sender resource and the destination resource in the event information, a conditional expression of an event type of the event information, and a conditional expression of the event data in the event information. In addition, the above conditional expressions may employ a form in which the process status information or the resource attribute information specifying an allowable condition or action range is referred to.

Prior to determination of a protective action, the action determining unit 158 can perform processing of selecting a resource targeted for the protective action by using the group-identified event information. The target resource herein may be, for example, the sender resource or the destination resource of the event information, all or part of the resources in the sender resource group, all or part of the resources in the destination resource group, and also an external system such as an external mail server.

After determining the protective action, the action determining unit 158 notifies the security gateway 140 of the protective action. The security gateway 140 includes an action taking unit 144. The action taking unit 144 actually takes the protective action notified by the analysis engine 150. The executable protective actions are not particularly limited to but may include a blocking of traffic, a change in traffic, an issuance of new traffic, and an alert.

When generating the event information from traffic, the security gateway 140 temporarily suspends the traffic as pending traffic, and the action taking unit 144 waits for the analysis engine 150 to complete the analysis. If notified of a blocking of traffic as the protective action, the action taking unit 144 blocks the targeted traffic. If notified of a change in traffic as the protective action, the action taking unit 144 modifies or corrects the pending traffic according to an instruction described in the obtained protective action, and releases the pending state. If notified of an issuance of new traffic as the protective action, the action taking unit 144 issues new traffic such as a halt instruction to the targeted resource.

Figure 2:
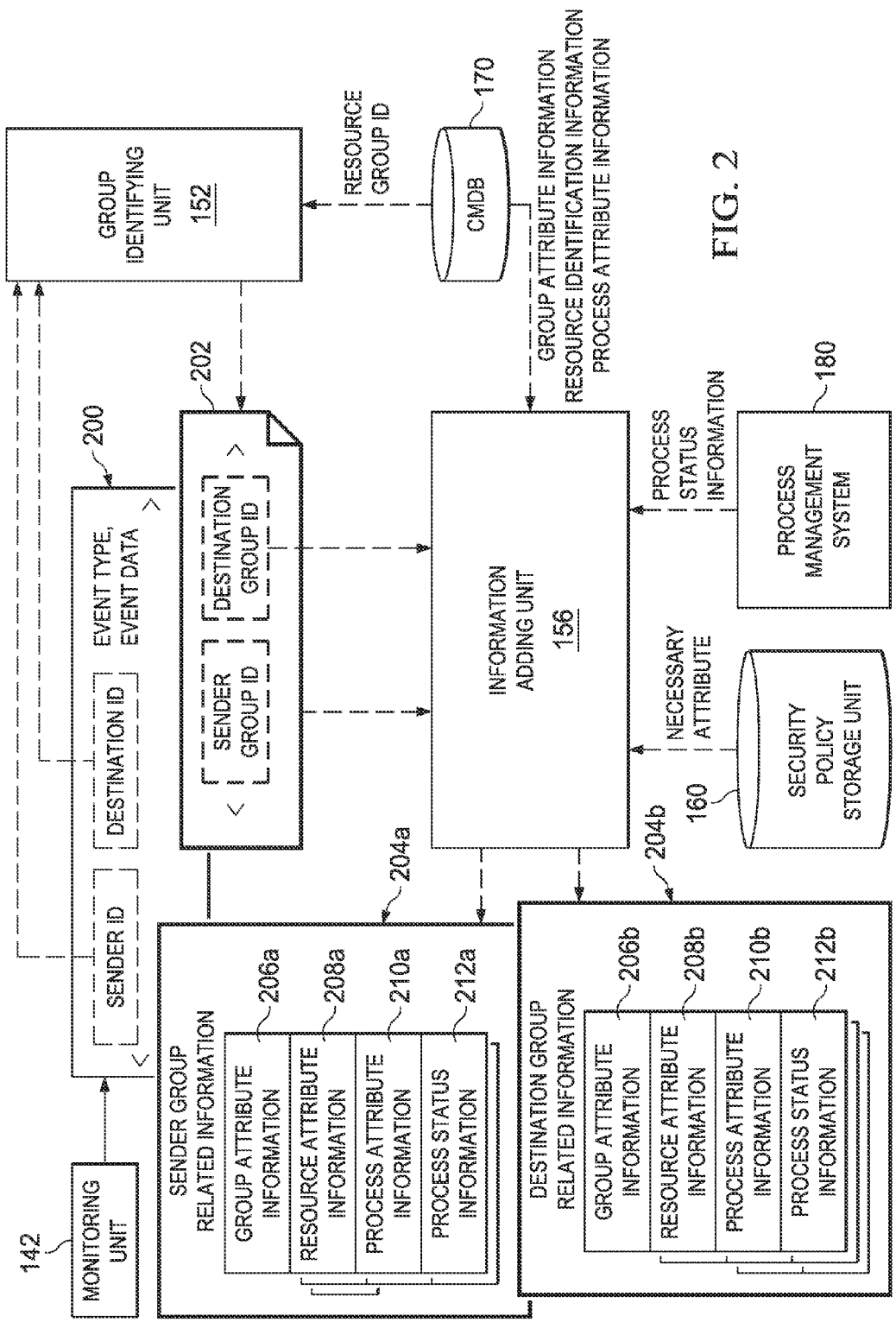
FIG. 2 is a diagram explaining data used in supervisory control processing based on anomaly detection in collaboration with a configuration management database.

Hereinafter, more detailed description of the supervisory control processing based on the anomaly detection in collaboration with the CMDB 170 will be provided with reference to FIGS. 2 to 5. FIG. 2 is a diagram explaining data used in the supervisory control processing based on the anomaly detection in collaboration with the CMDB 170. Event information 200 shown in FIG. 2 represents the event information passed from the monitoring unit 142 of the security gateway 140 to the analysis engine 150. The event information 200 includes a sender ID for identifying a sender resource, a destination ID for identifying a destination resource, an event type and event data. The sender resource and the destination resource respectively indicate the sender and the destination of the traffic data from which the event information is created. With relation to FIG. 1, in the case where the sensor output from the sensor 122 is to be received by the control system 102, for example, traffic data with the device 120, which is the sensor terminal, set as the sender and the control system 102 set as the destination is issued in the control network 130. The monitoring unit 142 of the security gateway 140 picks up the traffic data and passes the event information 200 of the traffic data to the analysis engine 150.

Referring back to FIG. 2, the group identifying unit 152 issues a query to the CMDB 170 by using the sender ID and the destination ID in the received event information 200, acquires a query result 202 including the group ID of a group including the sender resource (referred to as the "sender group ID" below) and the group ID of a group including the destination resource (referred to as the "destination group ID" below), and adds the query result 202 to the event information 200. Here, when the sender resource or the destination resource does not belong to any of the resource groups, a null value is acquired as the query result 202.

Figure 3:
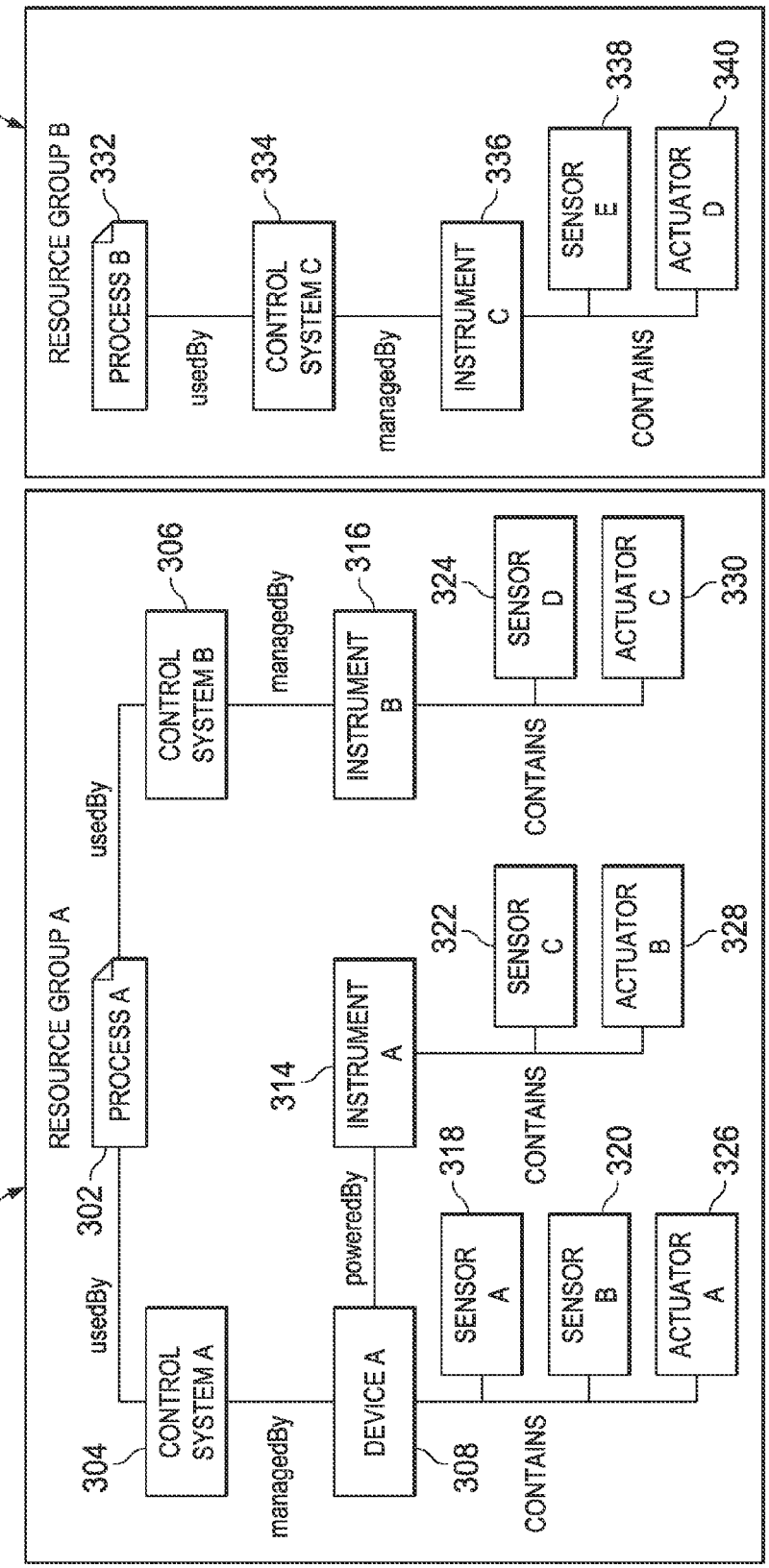
FIG. 3 is a diagram schematically showing relationships between configuration items built in the configuration management database.

FIG. 3 is a diagram schematically showing relationships between configuration items built in the CMDB 170. As shown in FIG. 3, one or more process CIs, one or more resource GIs, and relationships therebetween are defined in the CMDB 170. For example, a process CI instance ("process A" 302) is defined as having a "usedBy" relationship with each of resource CI instances ("control system A" 304 and "control system B" 306). This means that there is a dependence relationship in which the "control system A" 304 and the "control system B" 306 are used during the execution of the "process A" 302. The resource CI instance ("control system A" 304) is defined as having a "managedBy" relationship with a resource CI instance ("device A" 308). This means that there is a dependence relationship in which the "device A" 308 is managed by the "control system A" 304. The rest of the process CI instances and resource CI instances are defined in the same manner.

Here, FIG. 3 illustrates relationships between configuration items such as a use relationship "usedBy," a management relationship "managedBy," a necessity relationship "poweredBy," and a containment relationship "containes," but the dependency relationships are not limited to only these relationships. Various relationships such as "assigns," "canUse," "deployedOn," "Owned," and "runAt" can be defined. The dependency relationships may vary depending on the implementation of the CMDB, and may also employ user definitions.

FIG. 3 further illustrates two resource groups A 310 and B 312. The resource group A 310 includes the control systems A 304 and B 306, a device A 308, instruments A 314 and B 316, sensors A 318, B 320, C 322 and D 324, actuators A 326, B 328 and C 330. Similarly, the resource group B 312 includes a process B 332, a control system C 334, an instrument C 336, a sensor 338, and an actuator D 340. The processes and resources belonging to each of the resource groups are processes and resources directly or indirectly associated with each other by the foregoing relationships between the configuration items.

Referring back to FIG. 2, in the case where the sender or destination resource in the event information is the device A 308 of FIG. 3, for example, the CMDB 170 makes a response to the query from the group identifying unit 152 by sending the query result 202 including the group ID for identifying the resource group A 310 of FIG. 3 or the ID list of the resources in the resource group A 310 of FIG. 3. The resource groups A 310 and B 312 of FIG. 3 can be defined in advance or dynamically defined upon query from the group identifying unit 152. A resource group can be defined as follows: first, a query requesting for, for example, "all resources having a usedBY relationship with a process using a particular device" is used to obtain a set of CIs included in the resource group; and then the group is registered as a new CI in the CMDB 170.

Such a structure in the CMDB 170 is built through manual input to the CMDB 170, collaboration with an external system such as synchronization with a historian, notification from an asset management system or a definition update notification from the process management system 180, or automatic detection by a discovery function and a tracking function. In the embodiment described herein, the CMDB 170 is assumed to be always kept up to date by performing automatic detection by the discovery function and the tracking function at sufficiently short time intervals, and by being updated when necessary through the collaboration with the external system. The analysis engine 150 in the embodiment of the present invention performs anomaly detection in consideration of the aforementioned dependence relationships between resources via processes in collaboration with the CMDB 170 in which the processes are managed as configuration items in addition to the resources.

Upon receipt of the query result 202 including the sender group ID and the destination group ID, the group identifying unit 152 adds the query result 202 to the event information 200, and passes the resultant event information 200, that is, the group-identified event information 202 to the information adding unit 156 of the event analyzing unit 154 of FIG. 1. Upon receipt of the group-identified event information 200, 202, the information adding unit 156 appropriately enriches the group-identified event information 200, 202 by adding information needed for policy application. The security policy storage unit 160 stores one or more policies. In order to make the event information rich enough for the policy application, the information adding unit 156 acquires all kinds of attribute information and the like each referred to in a conditional expression defined in the matching description section of at least one of the policies. More specifically, the information adding unit 156 queries the CMDB 170 by using the sender group ID and the destination group ID in the group-identified event information 200, 202 and thereby acquires various kinds of attribute information related to the sender resource group and the destination resource group.

Hereinafter, the attribute information acquired by the information adding unit 156 will be described with reference to a data structure of the CMDB 170. FIG. 4 is a diagram illustrating the built data structure of the CMDB 170A. A configuration item table 220 shown in FIG. 4 includes a field 222 for storing the name of each configuration item; a field 224 for storing the category of each configuration item; a field 226 for storing the model of each configuration item; an attribute field 228; and a relationship field 230. Here, the model represents one of sub-categories into which a category is further subdivided. The relationship field 230 stores information on one or more relationships defined for a concerned configuration item, and more specifically stores a type of relationship and the name (or the identification number or the like) for identifying a configuration item paired with the concerned configuration item.

The attribute field 228 stores one or more sets of an attribute and an attribute value. The attributes specify and explain each configuration item. The attributes are not particularly limited to but may include attributes of a configuration item such as name, identification number, category (for identifying whether the configuration item is a resource or process) and type (for identifying whether the configuration item is a control system, instrument, device, sensor, actuator, or like) of a configuration item as well as other attributes such as model number, purpose, owner, issuer, location, duration of guarantee, version number, schedule such as start date/time, scheduled completion date/time, or deadline, status, and importance. Moreover, in the present embodiment, attributes for the resource CI may include an allowable condition range (rated value, expected value, or the like), an allowable action range (start, stop or change), and the like.

Note that the definitions of the attributes of the configuration item can be extended, and the attributes are not limited to the aforementioned ones. In addition, the attributes may differ by class (into which the configuration item is classified according to a type and category). In the embodiment of the present invention, since the attribute information is used in anomaly detection, it is sufficient to define at least attributes used in the anomaly detection. Here, the data structure shown in FIG. 4 is merely one example. The data structure is not particularly limited. In another embodiment, the data in the relationship field 230 or the like may be managed in another table.

Referring back to FIG. 2, in the present embodiment, the relationships between a process and a resource, between resources, among a resource group, a resource and a process are defined in the CMDB 170. Owing to this, the information adding unit 156 can acquire various kinds of attribute information related to the sender and destination resource groups by querying the CMDB 170 with use of the sender group ID and the destination group ID, and thereby can enrich the group-identified event information 200, 202. The various kinds of attribute information related to the groups may include various kinds of attribute information of the sender resource group and the destination resource group (hereinafter, referred to as group attribute information) 206, various kinds of attribute information of each resource in these resource groups (hereinafter, referred to as resource attribute information) 208, and various kinds of attribute information of each process therein (hereinafter, referred to as process attribute information) 210.

For example, if a conditional expression of an attribute value such as the aforementioned allowable condition range (rated value or expected value) or allowable action range (start, stop or change) is described in the matching description section in a policy, the anomaly detection can be performed, with use of the information of this allowable condition or action range, by judging whether or not the real value is within any of the allowable range and the expected range. The allowable condition range and the allowable action range may be specified by minimum values and maximum values, or may be specified by optional values listed in a limited way.

Moreover, the information adding unit 156 queries the process management system 180 by use of the process ID of each process in the sender resource group and the destination resource group acquired from the CMDB 170, and thereby acquires dynamic status information 212, such as a status value, related to the process in the sender resource group and the destination resource group (hereinafter, referred to as process status information 212). Hereinafter, the information acquired by the information adding unit 156 will be described with reference to a data structure managed by the process management system 180.

FIG. 5 is a diagram illustrating a data structure related to processes and managed by the process management system 180. A process management table 240 shown in FIG. 5 includes a field 242 for storing the process ID for identifying each process; a field 244 for storing the name of each process; a field 246 for storing the category of each process; and a field 248 for storing the dynamic status of each process. Moreover, the process management table 240 further includes plural fields 250, 252 and 254 for storing the schedule of each process, such as deadline, start date/time, scheduled completion date/time, and plural fields 256 and 258 for storing the issuer and the owner of each process, and a field 260 for storing the importance of each process. Although the process management table 240 shown in FIG. 5 also includes the same information as that in the configuration item table 220, the process management system 180 in the present embodiment stores the dynamically-changing status in the field 248 unlike the CMDB 170, and thus enables the anomaly detection in which the real-time status is reflected by using such dynamic status information.

Returning to FIG. 2 again, the information adding unit 156 acquires group-related information 204 including the group attribute information 206, the resource attribute information 208, the process attribute information 210 and the process status information 212, which are described above, from either or both of the CMDB 170 and the process management system 180 by using the sender group ID and the destination group ID, and adds these kinds of information to the group-identified event information 200, 202. The enriched event information 200, 202, 204 is applied to the security policies by the action determining unit 158 as described above, thereby a protective action is derived. Hereinafter, anomaly detection processing using the enriched event information and the security policies according to the present embodiment of the invention will be described in detail with reference to a flowchart.

Figure 6:
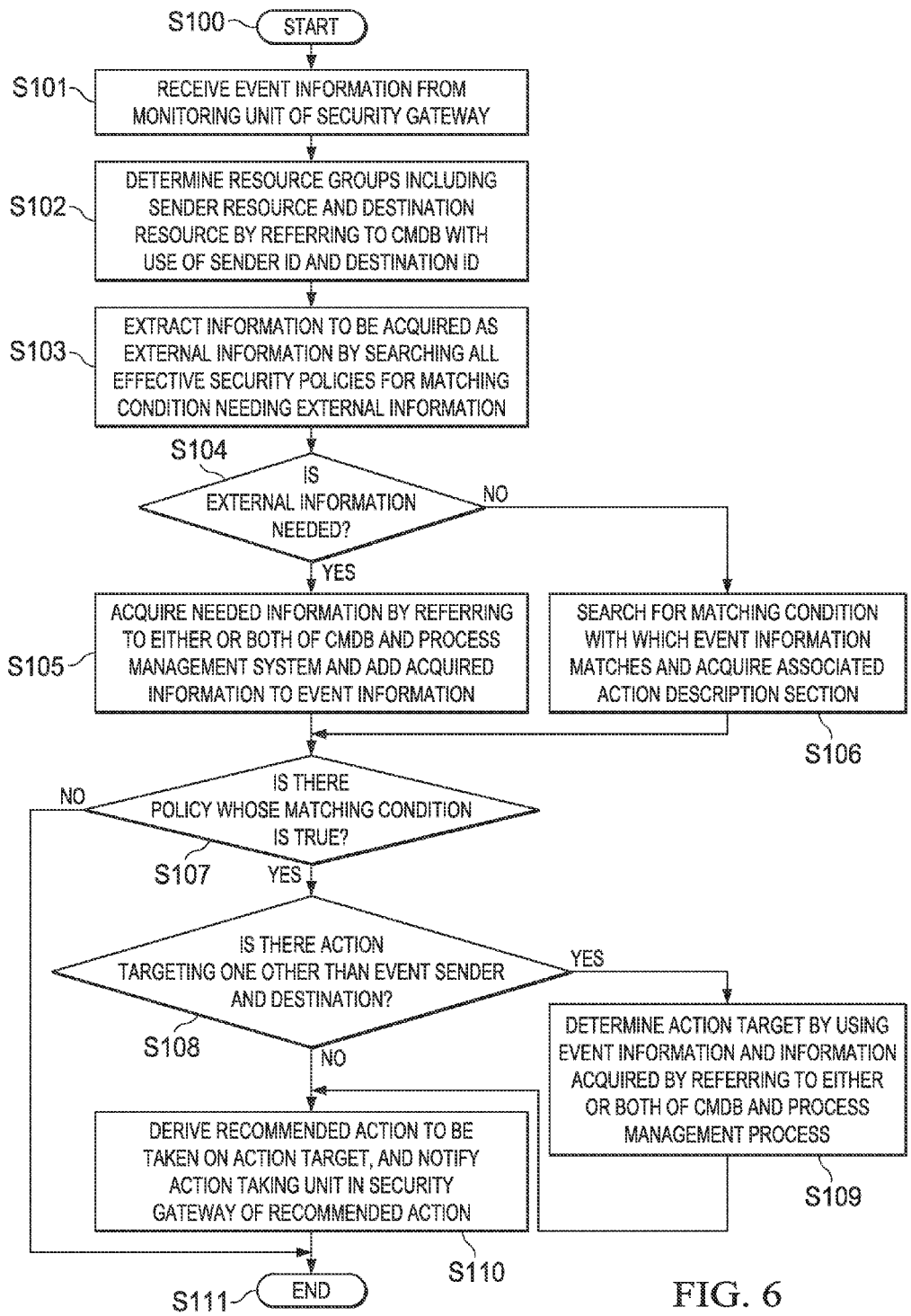
FIG. 6 is a flowchart showing anomaly detection processing executed by an analysis engine according to an embodiment of the present invention.

FIG. 6 is a flowchart showing the anomaly detection processing executed by the analysis engine 150 according to the embodiment of the present invention. The processing shown in FIG. 6 starts from step S100 in response to sending of the event information from the monitoring unit 142 of the security gateway 140 that has created the event information by picking up traffic data from the control network 130. Instead, in another embodiment, the processing is started from step S100 for each piece of event information in response to an input of the piece of event information to a wait queue for storing processing-waiting pieces of event information after the monitoring unit 142 sends the piece of event information. In step S101, the group identifying unit 152 receives the event information 200 from the monitoring unit 142 of the security gateway 140. In step S102, the group identifying unit 152 queries the CMDB 170 by using the sender ID and the destination ID included in the event information 200, determines the respective resource groups including the sender resource and the destination resource, and adds the query result 202 to the event information 200.

In step S103, the information adding unit 156 searches for a matching condition needing external information from among all the effective security policies stored in the security policy storage unit 160, and thereby extracts information to be acquired as the external information. In step S104, the information adding unit 156 determines whether or not the external information is needed. If it is determined that the external information is needed in step S104 (YES), the processing is caused to branch to step S105. In step S105, the information adding unit 156 queries either or both of the CMDB 170 and the process management system 180, acquires information needed to make evaluations on the matching description sections, adds the acquired information to the event information 200, 202, and advances the processing to step S106. On the other hand, if it is determined that no external information is needed in step S104 (NO), the processing is directly advanced to step S106.

Here, details of the security policies are described with reference to FIGS. 7A to 11B. FIGS. 7A to 7C, 8A and 8B, 9A and 9B, 10A and 10B, and 11A and 11B illustrate data structures of security policies, respectively. As shown in FIGS. 7A to 11B, each security policy includes the matching description section in which matching conditions are described, and the action description section in which one or more protective actions are described. The security policy shown in FIG. 7A is a policy assigned "1" as an identification number and specifies that, under the conditions that the status of a process using the sender resource is "running" and that event data included in the event information is out of the allowable range of the sender resource, a protective action targeting all the resources in the sender resource group should be taken by blocking all the events of an event type of "operation."

In the case of employing the security policy shown in FIG. 7A, the information adding unit 156 acquires, as information needed to make evaluations on the matching description section, the status information (status value) of a process in the sender resource group including the resource identified by the sender ID from the process management system 180, and the attribute information (allowable range) of the sender resource from the CMDB 170 in step S105. In the policy shown in FIG. 7A, the matching condition for the acquired status value of the process is described as a conditional expression of the status value of the process directly, and the matching condition for the acquired attribute value of the allowable range of the resource is described as a conditional expression of event data in which the attribute value of the allowable range is referred to.

The security policy shown in FIG. 7B is a policy assigned "2" as an identification number, and specifies that, under the conditions that that there is no process using the sender resource identified by the sender ID (that is a case where the null value is returned as a response to the query about the group ID corresponding to the sender ID) and that the event type is "sensor data," a protective action targeting an external mail system should be taken by issuing an alert thereto. In the case of employing the security policy shown in FIG. 7B, the information adding unit 156 can acquire, as necessary information, the group ID of the sender resource group including the sender resource and the attribute information thereof from the CMDB 170 in step S105. However, the group ID for identifying the sender resource group has been acquired and added to the event information by the group identifying unit 152. For this reason, if any information other than the group ID is not needed, the information adding unit 156 does not have to acquire any information as the information needed to make evaluations on the matching description section, in particular, for the security policy shown in FIG. 7B.

The security policy shown in FIG. 7C is a policy assigned "3" as an identification number, and specifies that, under the conditions that the status of a process using the destination resource is "running," that the event type is "operation," and that the event data included in the event information exceeds the maximum allowable value of the destination resource, a protective action targeting the destination resource should be taken by correcting the event data in the traffic data corresponding to the event information to the maximum allowable value of the destination resource. In the case of employing the security policy shown in FIG. 7C, the information adding unit 156 acquires, as necessary information, the status information (status value) of a process included in the destination resource group including the destination resource from the process management system 180, and the attribute information of the destination resource (the maximum value of the allowable range) from the CMDB 170 in step S105.

The same goes for the cases of employing the policies shown in FIGS. 8A to 11B, and the information adding unit 156 acquires, as the information needed to make evaluations on the matching description sections, information (the status value, importance, or the like) on a process using the sender or destination resource, information (the maximum value and the minimum value of the allowable range, or the like) related to the sender or destination resource from either or both of the process management system 180 and the CMDB 170 in step S105.

Here, returning to FIG. 6 again, the action determining unit 158 searches for matching conditions with which the event information 200, 202, 204 matches, and acquires the associated action description section in step S106. In step S107, the action determining unit 158 determines whether or not there is a policy whose matching conditions hold true. If it is determined that there is no policy whose matching conditions hold true in step S107 (NO), the anomaly detection processing is directly advanced to step S111 and is terminated. Then, the analysis engine 150 is kept on standby until the processing on the next event information starts. On the other hand, it is determined that there is a policy whose matching conditions hold true in step S107 (YES), the processing is caused to branch to step S108.

In step S108, the action determining unit 158 determines, from the description of the associated action description section, whether or not the policy includes a protective action targeting a resource other than the sender and destination resources of the event information. If it is determined that the policy includes an action targeting the resource other than the sender and destination resources in step S108 (YES), the processing is caused to branch to step S109. In step S109, the information adding unit 156 determines an action target by using the event information 200, 202 and the information 204 acquired by querying either or both of the CMDB 170 and the process management system 180, and advances the processing to step S110. In the case of the policy shown in FIG. 7A, for example, the information adding unit 156 acquires an ID list of other resources in the sender resource group including the sender resource from the CMDB 170, and sets the thus acquired resource IDs as the action targets.

If it is determined that the policy does not include an action targeting a resource other than the sender and destination resources, the processing is directly advanced to step S110. In step S110, the action determining unit 158 derives a recommended protective action targeting an action target, i.e., either or both of the sender and destination resources or the resource determined in step S109, notifies an action taking unit 144 in the security gateway 140 of the action target and the protective action, and terminates the anomaly detection processing in step S111.

Here, with reference to FIGS. 7A to 11B, according to the policy shown in FIG. 7A, if an operation using an unallowable value performed on a resource used by a process is observed, operation events on all the resources used by the process (all the resources in the same resource group) can be blocked. According to the policy shown in FIG. 7B, if sensor data is outputted from a resource not used by any process nor scheduled to be used, the output can be detected as a hidden threatening behavior (anomaly), and an alert can be issued. According to the policy shown in FIG. 7C, if an operation using an unallowable value performed on a resource used by a process is observed, the traffic data can be corrected to a proper value. Thus, an erroneous operation can be corrected to prevent occurrence of a failure.

Moreover, the security policy shown in FIG. 8A is a policy assigned "4" as an identification number, and specifies that, under the conditions that the status of a process using the sender resource is "running," that the event data included in the event information is out of the allowable range of the sender resource, and that the event type included in the event information is "operation," a protective action targeting all the resources in the destination resource group targeting should be taken by blocking all the events. According to the policy shown in FIG. 8A, an intrusion prevention system (IPS) can be implemented by detecting an abnormal event from the resource used by a process, and prohibiting the operations on all the resources used by the process.

The security policy shown in FIG. 8B specifies that, under the conditions that the status of a process using the sender resource is "running," and that the event data included in the event information is out of the allowable range of the sender resource, a protective action targeting all the resources in the sender resource group should be taken by issuing new traffic instructing emergency shutdown of the resources. According to the policy shown in FIG. 8B, the emergency shutdown of the resources suspected of intrusion can be implemented by detecting an abnormal event from the resources used by the process and instructing the emergency shutdown of all the resources used by the process.

The security policy shown in FIG. 9A specifies that, under the condition that the process ID of a process using the sender resource does not match with the process ID of a process using the destination resource, a protective action targeting all the resources in the sender resource group should be taken by blocking all the events. According to the security policy shown in FIG. 9A, communications between resources used by different processes can be detected and blocked, and thereby an independent virtual network can be built for each process.

The security policy shown in FIG. 9B specifies that under the conditions that the importance of a process using the sender resource is "HIGH," and that the event type included in the event information is "operation," a protective action targeting all the resources in the destination resource group should be taken by blocking all the events. According to the security policy shown in FIG. 9B, an operation performed on the resource used by the process with high importance can be detected, and thereby communications for the operation can be blocked. Thus, a function such as a firewall filter can be implemented.

The security policy shown in FIG. 10A specifies that, under the condition that the importance of a process using the sender resource is lower than the importance of a process using the destination resource, a protective action targeting all the resources in the destination resource group should be taken by blocking all the events. According to the security policy shown in FIG. 10A, communication from a resource in the resource group used by a process with low importance to a resource in the resource group used by a process with high importance can be detected and blocked. Thus, zoning according to a security level can be implemented.

The security policy shown in FIG. 10B specifies that, under the conditions that the importance of a process using the sender resource is "LOW" and that the event data included in the event information is within the allowable range of the sender resource, a protective action targeting the sender source should be taken by blocking all the events. According to the security policy shown in FIG. 10B, if the sensor value of a resource used by a process with low importance is within the allowable range, communication from the resource can be blocked, and thereby traffic of normal-condition data with low importance can be reduced.

Although various security policies have been described so far with reference to FIGS. 7A to 10B, the aforementioned security policies are intended to analyze pieces of the event information notified by the security gateway 140 on a piece-by-piece basis to detect an anomaly, and to cause a protective action against an anomaly to be taken if the anomaly is found. The security policies, however, are not necessarily defined based on each piece of even information. Specifically, if the analysis results of plural pieces of event information are stored for the time being, a matching condition can be described containing a conditional expression related to history information (pieces of event information that occurred in the past) accumulated in relation to the sender or destination of event information as a current process target. In this way, a protective action can be derived in a selective or stepwise manner corresponding to a combination, sequence or statistics of plural pieces of event information. FIGS. 11A and 11B illustrate security policies for deriving protective actions stepwise corresponding to plural pieces of event information.

The security policy shown in FIG. 11A specifies that predetermined protective actions should be taken under the conditions that the status of a process using the destination resource is "running," that the event type is "operation," that the event data of the event information exceeds the maximum allowable value of the destination resource, and that an anomaly (limited to the anomaly judged as being out of the allowable range) occurs less than five times per hour in the whole destination resource group. As the above predetermined protective actions. FIG. 11A illustrates two protective actions including a protective action to correct event data targeting the destination resource, and an additional protective action to record, as an internal state record, the occurrence of an anomaly (limited to the anomaly judged as being out of the allowable range) in the destination resource group. The occurrence of an anomaly can be recorded as history data which is a record indicating the occurrence date/time and the description of the anomaly and stored temporarily and internally in the analysis engine 150. The history information thus held internally can be acquired by the information adding unit 156 as the information needed to make evaluations on the matching description sections, when necessary.

In contrast, the security policy shown in FIG. 11B specifies the same matching conditions as those in the policy shown in FIG. 11A except the matching condition that an anomaly (limited to the anomaly judged as being out of the allowable range) occurs five times or more per hour in the whole destination resource group. For the protective action to be taken when the foregoing matching conditions are satisfied, the security policy shown in FIG. 11B specifies a protective action, targeting all the resources in the destination resource group, to instruct resource emergency shutdown of the resources, and an additional protective action to reset, as the internal state record, the anomaly occurrence records for the destination resource group.

Use of a combination of the two security policies shown in FIGS. 11A and 11B enables derivation of stepwise protective actions for the case where the event data included in the event information exceeds the maximum allowable value of the destination resource. In the stepwise protective actions, the protective action in which the event data in the traffic data corresponding to the event information is corrected to the maximum allowable value of the destination resource is taken for the time being, and then, when the frequency of the violation of the same rule exceeds than a predetermined frequency, the protective action to cause a shutdown event is taken instead of the above event data correction.

As has described above, according to the supervisory control of the above embodiments, use of the configuration management database 170 makes it possible to analyze the current states inside the control network 130 with the dependence relationships between processes and resources in the control network 130 taken into consideration, and thereby to favorably detect a situation in which an anomaly is suspected in the behavior of the resource group as a whole. In addition, an appropriate protective action and a target on which the action is to be taken can be determined with the dependence relationships between processes and resources in the control network 130 taken into consideration. Thus, the supervisory control described above enables favorable detection of an anomaly that is difficult to detect from the behavior of a single resource, such as an actuator alone, and therefore effectively prevents the security of industrial control systems from being compromised in the transition to open systems.

Note that, the aforementioned analysis engine 150 may be alone implemented on a general purpose computer system including one or multiple general purpose computers, may be implemented as a specific purpose instrument, or may be implemented integrally with the functions of the security gateway 140.

As has described above, according to the embodiments of the invention, provided are an anomaly detection apparatus, a supervisory control system, an anomaly detection method, program and recording medium, which are capable of detecting a behavior suspected to have an anomaly from data traffic flowing in a network from and to components such as devices, instruments, sensors, and actuators in a control system, in consideration of dependence relationships between the components by using a configuration management database, and causing a protective action to be taken promptly.

An analysis engines according to an embodiments of the present invention is provided as an anomaly detection apparatus in which the functional units are implemented by loading a computer-executable program to a computer. Such a program can be created as a computer-executable program written in a legacy programming language or Object-oriented programming language, such as FORTRAN, COBOL, PL/I, C, C++, Java (registered trademark), Java (registered trademark) Beans, lava (registered trademark) Applet, Java (registered trademark) Script, Perl, or Ruby, and can be distributed as a device-readable recording medium in which the program is stored.

Although the present invention has been described so far based on the embodiments and examples shown in the drawings, the present invention is not limited to the embodiments shown in the drawings, but may be modified by other embodiments, addition, modification, deletion and the like within a range conceivable by those skilled the art. Any embodiment of the present invention is included in the scope of the present invention as long as the embodiment can produce the same effects as the present invention.

Description of Embodiments 100 industrial system
102 control system 104 console system
106 maintenance system
108 analysis system
110 instrument
112 sensor
114 actuator
120 device
122 sensor
124 actuator
130 control network
140 security gateway
142 monitoring unit
144 action taking unit
150 analysis engine
152 group identifying unit
154 event analyzing unit
156 information adding unit
158 action determining unit
160 security policy storage unit
170 configuration management database (CMDB)
180 process management system
200 event information
202 query result
204 group-related information
206 group attribute information
208 resource attribute information
210 process attribute information
212 process status information
220 configuration item table
222-230 field
240 process management table
242-260 field

The invention claimed is:

1. An anomaly detection method executed by an anomaly detection apparatus configured to detect an anomaly in a control network including at least one control system, the method comprising the steps, executed by the anomaly detection apparatus, of:
 receiving, by a processor, event information on an event that occurs in the control network;
 identifying, by the processor, a group including a resource related to the event information by referring to a configuration management database for retaining dependence relationships between processes and resources including the control system;
 applying, by the processor, the event information to one or more policies each of which associates one or more actions with a condition defining a situation suspected to have an anomaly;
 determining, by the processor, the one or more actions associated with the matched condition as one or more actions to be taken; and
 implementing, by the processor, the one or more actions to be taken.

2. The anomaly detection method according to claim 1, further comprising:
 acquiring, by the processor, information related to the group and needed for application to the one or more policies; and
 adding, by the processor, the acquired information to the event information, wherein:
 the information related to the group at least one kind of information from among status information of a process belonging to the group, attribute information of a process belonging to the group, and attribute information of a resource belonging to the group, which are acquired from an external system, and wherein the condition includes a conditional expression including the information related to the group.

3. The anomaly detection method according to claim 2, wherein:
 the attribute information of the resource specifies either or both of an allowable condition range and an allowable action range of the resource, and
 the condition includes a conditional expression in which the attribute information specifying any of the ranges is referred to.

4. The anomaly detection method according to claim 3, wherein:
 the condition includes a conditional expression of a process related to a sender resource in the event information, a conditional expression of a process related to a destination resource in the event information, a conditional expression of both processes related to the sender resource and the destination resource in the event information, a conditional expression of an event type of the event information, a conditional expression of the event data in the event information, and a conditional expression related to past event information that occurred in the past in relation to the sender resource or destination resource of the event information.

5. The anomaly detection method according to claim 1, wherein:
 the policies each include description specifying a target resource on which the one or more actions are to be implemented, and
 the method further comprises determining, by the processor, as the target resource, all or part of the resources belonging to the group according to the description.

6. The anomaly detection method according to claim 1, wherein the method further comprises:
 adding, by the processor, either a group identification value for identifying a group including any one of a sender resource and a destination resource or a list of identification values of resources belonging to the group, to an identification value of the sender resource, an identification value of the destination resource, an event type and event data, which are included in the received event information.

7. The anomaly detection method according to claim 1, wherein:
 the actions include a blocking of traffic, a change in traffic, ara issuance of new traffic, and a notification of an alert,
 the control network includes a plurality of resources of one or more kinds selected from the group consisting of a control system, a device, an instrument, a sensor and an actuator.

* * * * *